Dec. 25, 1956 D. W. RUBIDGE ET AL 2,775,298
LEDGER POSTING MACHINE
Filed Nov. 17, 1953
12 Sheets-Sheet 1

FIG.1

CYCLE 1

READ TENS ORDER DIGIT AT STATION 32 TO SETUP MATRIX.

CYCLE 2

READ TENS ORDER DIGIT FOR CHECK "B" AT STATION 32 TO SETUP MATRIX. POST UNITS ORDER DIGIT FOR CHECK "A" INTO POSTING FIELD OF CHECK "B", THROUGH MATRIX CIRCUIT CONDITIONED IN ACCORDANCE WITH CHECK "A" TENS ORDER DIGIT.

CYCLE 3

SIMILAR OPERATION TO THAT IN CYCLE 2. IN ADDITION, DATA POSTED IN CHECK "B" IS GANGED PUNCHED INTO THE POSTING FIELD OF CHECK "C".

CYCLE 4

SIMILAR POSTING AND GANG PUNCH OPERATIONS TO THOSE IN CYCLE 3. SINCE "3L" IS A LEDGER CARD, MATRIX IS NOT SETUP.

CYCLE 5

READ TENS ORDER DIGIT FOR CHECK "D" TO SETUP MATRIX. NO POSTING AND NO GANG PUNCHING. CURRENT FIELD POSTINGS 115 AND TO-DATE FIELD POSTINGS 116 ARE COMPARED.

CYCLE 6

SIMILAR OPERATION TO THAT IN CYCLE 4.

INVENTORS
DAVID W. RUBIDGE
JOHN R. NATVIG
FREDERICK S. HULING
BY
J. Tancin Jr.
ATTORNEY

INVENTORS
DAVID W. RUBIDGE
JOHN R. NATVIG
FREDERICK S. HULING

BY

ATTORNEY

Dec. 25, 1956     D. W. RUBIDGE ET AL     2,775,298
LEDGER POSTING MACHINE Filed Nov. 17, 1953

*INVENTORS*
DAVID W. RUBIDGE
JOHN R. NATVIG
FREDERICK S. HULING

BY

ATTORNEY

Dec. 25, 1956

D. W. RUBIDGE ET AL 2,775,298

LEDGER POSTING MACHINE

Filed Nov. 17, 1953

INVENTORS
DAVID W. RUBIDGE
JOHN R. NATVIG
FREDERICK S. HULING

BY

ATTORNEY

Dec. 25, 1956 D. W. RUBIDGE ET AL 2,775,298
LEDGER POSTING MACHINE
Filed Nov. 17, 1953 12 Sheets-Sheet 8

FIG. 7b

INVENTORS
DAVID W. RUBIDGE
JOHN R. NATVIG
FREDERICK S. HULING
BY
ATTORNEY

United States Patent Office 2,775,298
Patented Dec. 25, 1956

2,775,298

LEDGER POSTING MACHINE

David W. Rubidge, Chatham, N. J., and John R. Natvig, Great Kills, and Frederick S. Huling, Binghamton, N. Y., assignors to International Business Machines Corporation, New York, N. Y., a corporation of New York Application November 17, 1953, Serial No. 392,696

8 Claims. (Cl. 164—115)

This invention relates in general to record controlled data recording machines, and in particular to record card controlled ledger posting machines.

It is a generally accepted fact that modern business requirements call for the daily usage of an overwhelming number of negotiable instruments. And, according to good bookkeeping practice, "journal" data relating to each negotiable instrument which is involved in a business transaction, must be posted upon a ledger. In view of the great number of negotiable instruments handled daily, it must be apparent that such a ledger posting procedure is normally time consuming, quite costly and subject to error.

A general object of this invention is to provide a machine well-suited for efficient and high-speed ledger posting operations.

In keeping with the foregoing, it is another object of this invention to provide an improved record controlled data recording machine.

The embodiment of the invention described herein automatically posts data contained on each one of a group of associated bank checks, onto a single related ledger card having a data posting field thereon. Inasmuch as blank bank checks are usually made up in checkbooks, one hundred checks per checkbook for example, a ledger card may relate to all one hundred bank checks in one book. Hence, inspection of such a ledger card will indicate which checks from a given checkbook have been negotiated, and which checks within the group designated by the checkbook, remain outstanding.

The ledger card data posting field consists of sequentially arranged posting positions, one for each check within the checkbook group associated with the ledger card. Consequent upon the analysis of a multi-group identification number of a negotiated check, the embodiment described in detail hereinafter causes a single perforation to be effected in a posting position corresponding to the aforementioned identification number.

Accordingly, another object of this invention is to provide a novel ledger card posting machine.

Another object of this invention is to provide a device whereby journal entry data is posted in corresponding posting positions in a sequentially arranged field of posting positions.

Another object of this invention is to provide a punching machine for effecting a duo-order number representing perforation corresponding to the digital value thereof, in a posting position located in a posting field.

A specific object of this invention is to provide an improved record card controlled apparatus for recording a duo-order digit representing coordinate in a rectangular coordinate system posting field.

Other objects of the invention will be pointed out in the following description and claims and illustrated in the accompanying drawings, which disclose, by way of example, the principle of the invention and the best mode which has been contemplated, of applying that principle.

In the drawings:

Figs. 7a to 7g comprise a wiring diagram.

*Ledger and journal records*

Figure 5:
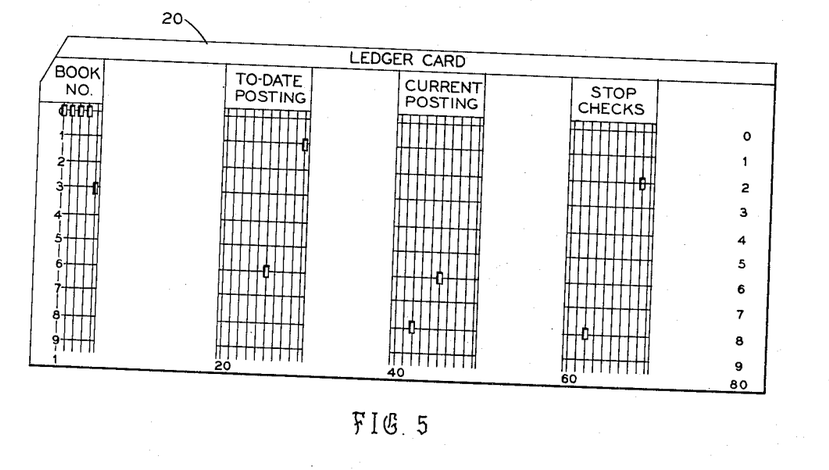
Fig. 5 is a view of a ledger record card.

Referring to Fig. 5, there may be seen a typical ledger card 20. The ledger card is similar to the well-known IBM punched card, and therefore, consists of 80 vertical columns and 12 horizontal rows. An index point record-position R to 9, inclusive, is determined by the intersection of the columns and rows shown in Fig. 5. Each ledger card is associated with the checks within a particular checkbook relating to the ledger card.

Figure 6:
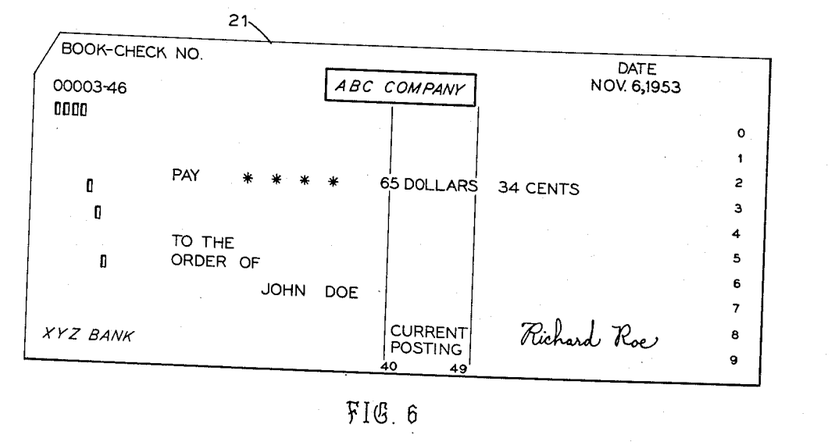
Fig. 6 is a view of a journal record card for use as a bank check.

Referring to Fig. 6, there may be seen a typical bank check 21 from within the checkbook to which ledger card 20 relates. Inasmuch as this check is printed upon the well-known IBM punched card, data is recorded thereon by perforating the card at index point positions in conformance to the well-known IBM punched hole code.

For the purposes of this description, it will be assumed that each checkbook contains one hundred blank checks, each of which is identified sequentially from 00 through 99. As is shown in Figs. 5 and 6, the checkbook number is recorded in punched hole form in columns 1 through 5 of both the ledger card 20 and the check 21. Columns 6 and 7 of a check are reserved for the identification number of the check within the book. Thus, the holes punched in columns 6 and 7 of the check shown in Fig. 6, designate bank check 21 to be the forty-seventh check in checkbook No. 00003. Columns 20 through 29 define the to-date posting field whereas columns 40 through 49 define the current posting field. Each column in the aforementioned posting fields is indicative of a digit in the tens order position of the bank check multi-order identification number. More specifically, columns 29 through 20 represent digits 0 through 9, respectively, and columns 49 through 40 also represent digits 0 through 9, respectively. Furthermore, each of the index point position rows 0 through 9 in the aforementioned posting fields is indicative of a corresponding digit of the units order position of the bank check due-order identification number. As a result, any single perforation in a posting field represents a multi-order check identification number. For example, the forty-seventh bank check 21 from the checkbook No. 00003, shown in Fig. 6, is represented by the six index point position perforation in column 25 of the ledger card relating to the same checkbook. In the same fashion, the eight index point position perforation in column 42 represents check number 78 and the one index point perforation in column 29 represents check number 01. Hence a multi-order check identification number is represented as a coordinate in a rectangular coordinate system posting field.

Quite frequently stop check orders are issued so as to stop payment on a specific check. As is shown in Fig. 5, the stop check order field is defined by columns 60 through 69 so as to provide a stop check position for each check in the checkbook. This field is similar to the to-date and current posting fields described hereinabove; as a result, the two index point perforation in column 68 indicates that a stop check order has been issued for check No. 12 of checkbook Number 00003. As will be described in detail hereinafter, a check which is negotiated after a stop check order has been issued will automatically be detected by the ledger posting machine.

*Punching machine*

Figure 4:
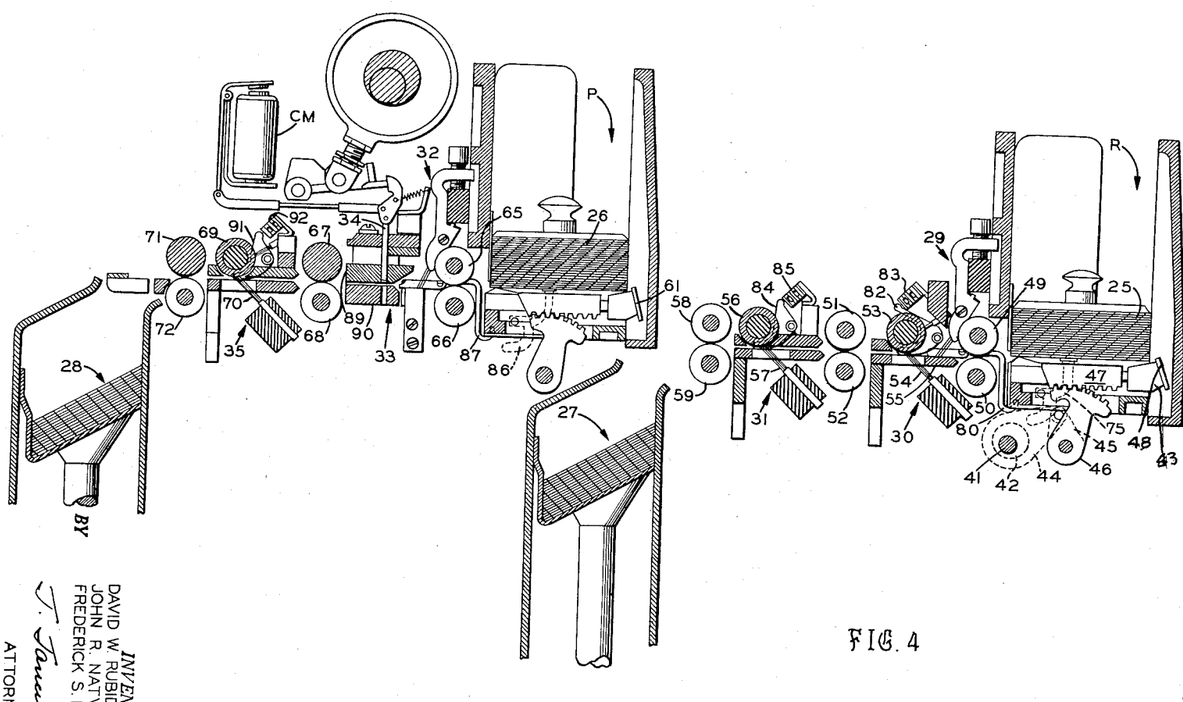
Fig. 4 is a sectional elevation view of a record card punching machine showing the feeding, sensing and perforating devices.

The high-speed ledger posting machine is constructed according to the principles set forth in Patent Re. 21,133 issued to C. D. Lake on June 27, 1939, and is shown in Fig. 4. Reference may be had to this patent for a full and comprehensive understanding of the various machine parts and functions thereof, as well as of the operation of the device as a whole. Briefly, however, and for the purpose of illustration, during normal reproducing operation of the machine a number of pattern cards 25 (Fig. 4) are contained in a hopper R and an additional group of detail cards 26 are contained in a hopper P. The cards are fed singly and concurrently from both hoppers and are then shifted in synchronism through sensing and punching stations before being deposited in stackers 27 and 28.

Upon leaving the hopper R, each pattern card 25 first encounters first read sensing brush station 29, then second read brush station 30, and finally third read brush station 31. The retail cards 26 upon leaving the hopper P each pass first punch sensing brush station 32, then a punch station 33 having a line of punches 34 therein, and finally second punch sensing brush station 35. As the description advances, the circuits controlled by the various card sensing stations will be described in detail.

During a reproducing operation, electrical connections exist between the brushes in second read brush station 30 and the control magnets CM for the line of punches 34 so that when a perforation is sensed in a pattern card 25, a hole is punched in the related detail card 26 in a corresponding position. After the cards have passed the second read sensing station 30 and the punching station 33 respectively, the punched data therein is analyzed by the separate reading stations 31 and 35. In these stations the pattern card 25 is sensed by the brushes within station 31 at the same time that the related detail card is analyzed by the brushes within station 35. If the perforations being checked in both cards do not agree, the machine is caused to stop and a lamp or other signal indicates the error.

During gang punch operation of the machine, a number of record cards are contained in hopper P. Upon leaving the hopper P, each card 26 is fed past stations 32, 33 and 35 as described previously. During this operation, electrical connections exist between the brushes within station 35 and the control magnets CM for the line of punches 34 so that when a perforation is sensed in a card 26, a perforation is punched in the next succeeding card 26 in a corresponding position. That is, a pattern of holes sensed by the brushes within station 35 causes a similar pattern of holes to be recorded in the next following record card.

A motor (not shown) is provided to afford suitable driving connections for the card feeding mechanisms under control of a punch clutch to govern the feeding of cards from hopper P to stacker 28, and a read clutch to govern the feeding of cards from hopper R to stacker 27. When read clutch magnet 40 (see also Fig. 7a) is energized, shaft 41 (Fig. 4) is caused to rotate. This shaft is provided with an eccentric 42 for operating card feed picker slides 43. Encircling the eccentric is a strap 44 which receives a reciprocating motion for each rotation of the shaft 41. The strap 44 is formed with an ear pivotally attached to an arm 45 which also carries a pair of gear sectors 46. The sectors 46 mesh with racks 47 provided on the bottom of the picker slides 43 and form a driving connection therewith. The slides 43 carry a projecting picker knife 48 which is adapted to engage the bottom card in the hopper R.

It is apparent from the foregoing description that when the read clutch magnet is energized, the picker knife 48 is moved to the left to thereby carry the bottom record card 25 in the hopper R into cooperation with a pair of feeding rollers 49 and 50. Such a feeding action occurs during each cycle of operation when the read clutch magnet is energized.

Rollers 49 and 50, when turning, draw the card moved by picker knife 48 from beneath the hopper R and feed it to the left between the brushes of first read brush station 29 and second read brush station 30, and over to other feeding rollers 51 and 52. A contact roller 53 is associated with brushes 54, and a contact plate 55 is associated with the brushes in reading station 29. Contact roller 53 is driven by gear connections from the feed roller 49 which, in turn, is driven by gear connections from shaft 41.

Rollers 51 and 52, when turning, draw a card traversing the second brush station 30 and feed it to the left between contact roller 56 and brushes 57 within third read brush station 31. The card is further advanced to the left to engage rollers 58 and 59 so that these rollers, when turning, advance the card into stacker 27.

A punch clutch magnet 60 (see also Fig. 7a) is energized when card feed drive connections are established to advance the cards from hopper P into stacker 28. When the punch feed drive shaft (not shown) is operated consequent upon the energization of the punch clutch magnet, certain driving connections are rendered operative to actuate the card picker mechanism under the hopper P, which is similar to the previously described card picker mechansim under the hopper R and which is generally designated by the reference character 61. Additionally, a driving connection exists between the punch feed drive shaft and the third read brush station feed rollers. A third driving connection exists, and operates to release a clutch connection in a Geneva drive gear whereby intermittent motion of the card is brought about as the card traverses the punching station 33. These various driving connections are not fully disclosed in the accompanying drawings, but reference may be had to the Lake patent previously mentioned for a full disclosure thereof. It is deemed sufficient to state that the operation of punching is timed to occur during the pause in card feeding when the Geneva drive wheel mechanism is not in action.

A plurality of punch feeding rollers 65, 66, 67 and 68 are suitably driven for feeding cards under the line of punches 34. Suitable connections also extend to the Geneva gear drive, previously referred to, for applying intermittent motion to the cards passing through punching station 33. The connections just referred to for the Geneva drive mechanism include a clutch between the Geneva gear wheel proper and the feed rollers so that feeding may be prevented when cards are not to be punched. This clutch mechanism is so designed that if the punch clutch magnet is not energized, there is no driving connection to the Geneva wheel arrangement, and if this latter magnet is energized the usual driving connection is existent.

Rollers 67 and 68, when turning, draw a card from within punching station 33 and feed it to the left between contact roller 69 and brushes 70 within second punch brush station 35. The card is advanced further to the left to engage feed rollers 71 and 72 which, when turning, cause the card to be fed into stacker 28.

*Punching machine circuits*

Figure 7A:
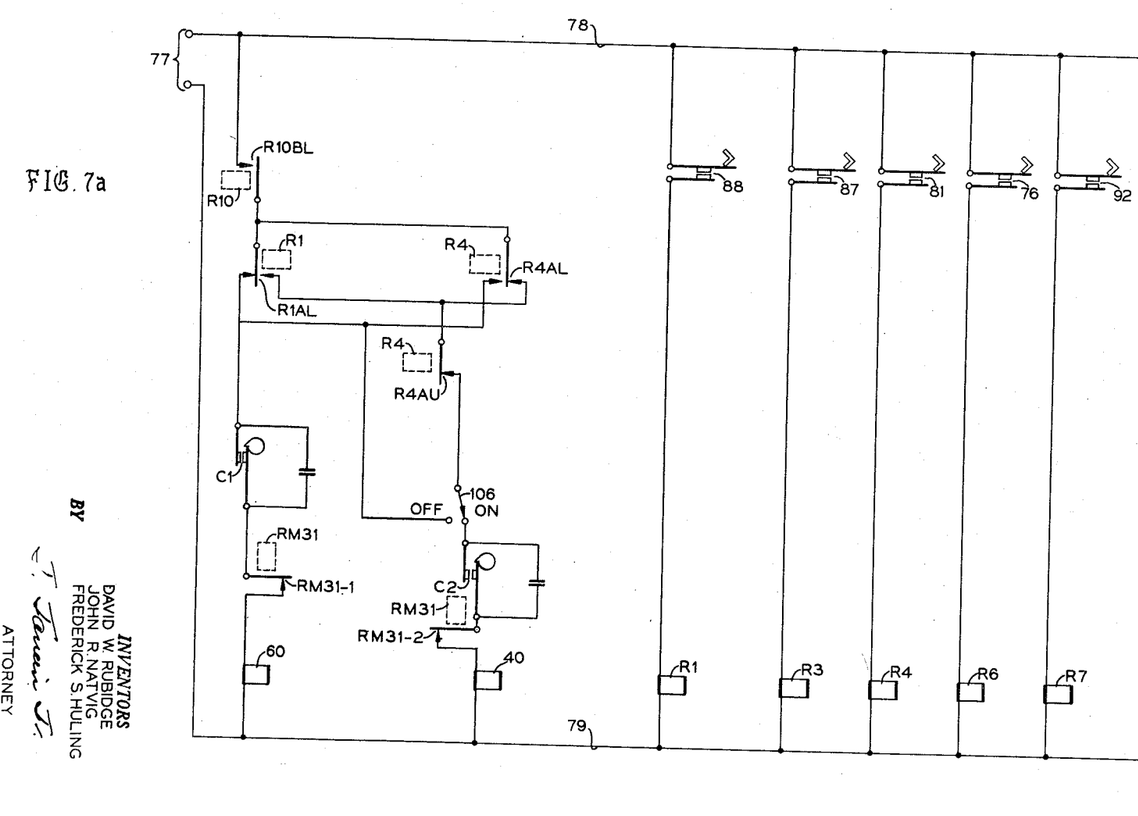

In the operation of the punching machine, when a group of cards 25 is placed in the hopper R, the bottom card depresses a hopper contact lever 75, closing contacts 76 of Fig. 7a to thereby energize relay R6 connected in series circuit therewith. As is shown in Fig. 7a, a suitable source of potential 77 causes a voltage to be applied to lines 78 and 79. Subsequently, when the read feed picker mechanism is operated the bottom card alone is moved through a card feed throat, past first reading brush station 29 (Fig. 4) to second reading brush station 30. Upon entering station 30, the card engages and operates the card lever 80, closing contacts 81 (Fig. 7a) to thereby energize relay R4. Shortly thereafter the card operates a card lever 82 (Fig. 4), closing contacts 83 (Fig. 7c) to condition second read brush station 30 for card sensing. The card passes onto feed rollers 51 (Fig. 4) and 52, which feed the card between a pair of guide plates. A card lever 84 is operated as the card passes through checking station 31, to thereby close contacts 85 (see also Fig. 7c).

Cards 26 in hopper P depress a hopper contact lever 86, closing contacts 87 shown in Fig. 7a, to thereby energize relay R3. Upon operation of the picker mechanism 61 (Fig. 4), the bottom card 26 passes through a card feed throat to operate a card lever 87, and to thereby close contacts 88 (Fig. 7a) so as to energize relay R1. The card is fed between a stripper plate 89 (Fig. 4) and a die plate 90 to feed rollers 67 and 68, which latter rollers further feed the card between guide plates associated with punch reading brush station 35. A card lever 91 is operated as the card passes through station 35 whereupon contacts 92 (Fig. 7a) are closed and relay R7 is energized.

*Reproducing*

Figure 7B:
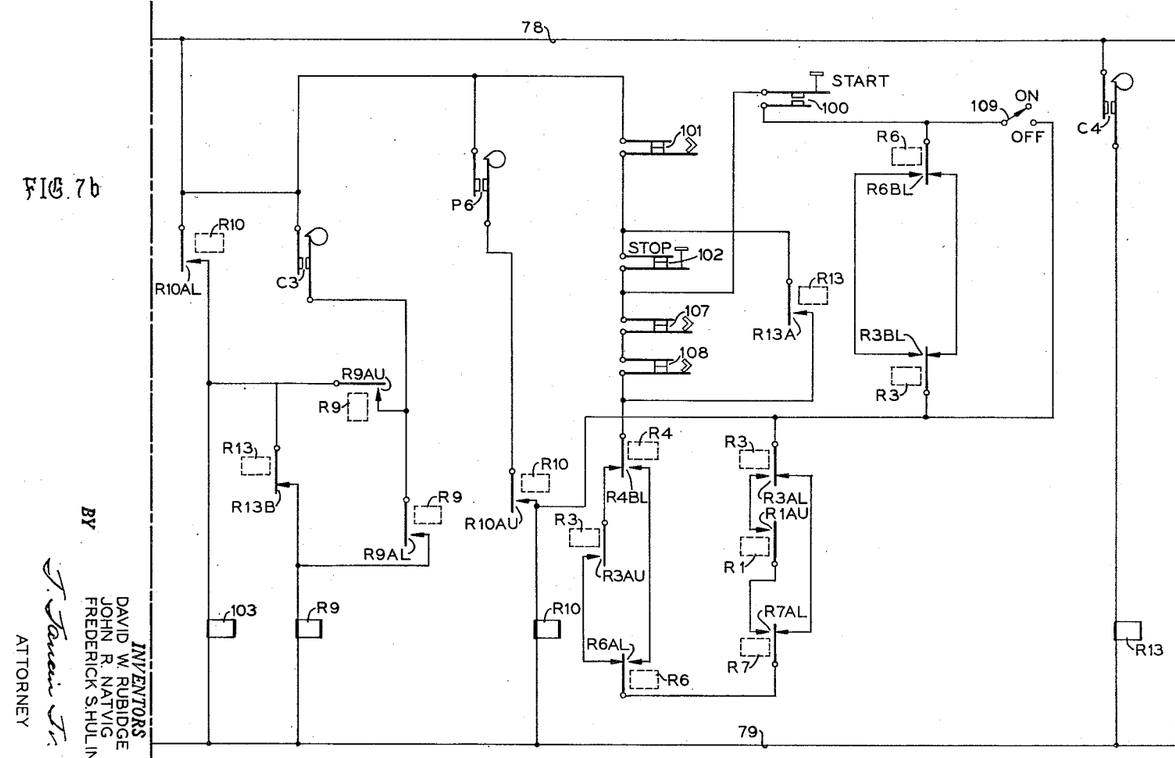
Figure 8:
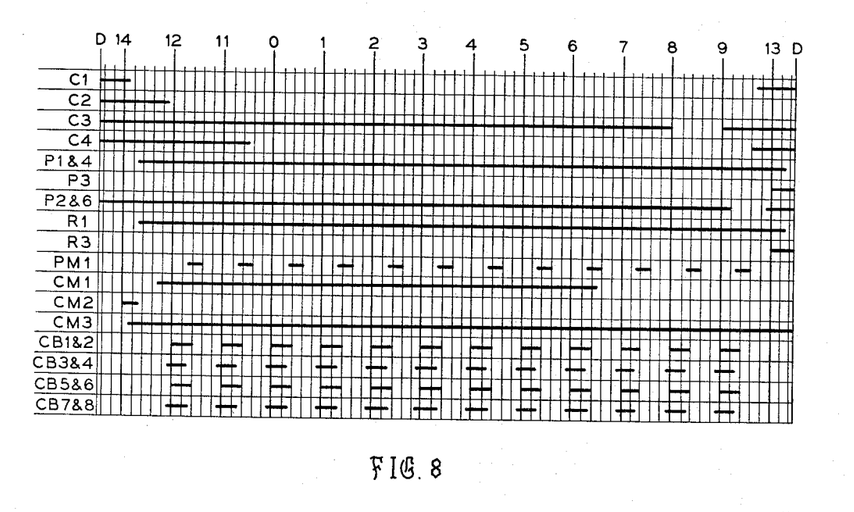
Fig. 8 is a timing chart.

To start the machine, the start key shown in Fig. 7b is depressed in order to close start contacts 100 whereby a circuit is completed to start relay R10 from line 78 through comparing contacts 101, stop contacts 102, start contacts 100, relay contacts R6BL normally open (n/o), R3BL n/o, relay R10, to line 79. When relay R10 is energized, contacts R10AU close and in conjunction with cam contacts P6, provide a hold circuit for relay R10. Contacts R10AL, now being closed, provide a pickup and hold circuit for heavy duty drive motor magnet 103. Since timing interlock relay R13 is energized between 9.6-time and 11.5-time (see also Fig. 8) under control of cam contacts C4, relay R9 will pick up at any time between 11.5-time and 9.6-time from line 78 through relay contacts R10AL and R13B, relay R9, to the other side of the line. Relay R9 will subsequently hold through contacts R9AL and R9AU or C3.

The start key must be depressed sufficiently long to keep relays R9 and R10, and heavy duty magnet 103, energized until cam contacts C1 (Fig. 7a) and C2 are closed. Assuming cards to be present in both hoppers P and R (see also Fig. 4), only card lever relays R3 (Fig. 7a) and R6 are energized at this time. Hence, a first feed cycle is effected in both card feeds when a circuit is completed to punch feed clutch 60 from line 78 through contacts R10BL, R1AL normally closed (n/c), C1, and RM31–1; and when a circuit is completed to read feed clutch magnet 40 from line 78 through contacts R10BL, R4AL n/c, R4AU, switch 106 engaged the "on" contact, and contacts RM31–2. During the first feed cycle, the read card lever contacts 81 and the die card lever contacts 88 will be closed by cards acting upon their respective levers, to thereupon energize relays R4 and R1, respectively, as described previously. Read card lever contacts 83 (Figs. 4 and 7c) are also closed to condition card reading station 30. If, after the first feed cycle, the start key is released, the machine will stop because relay R10 (Fig. 7b) will be de-energized when cam contacts P6 open at 9.5-time. Depression of the start key for a second time will cause relay R10 to energize a second time from lines 78 through contacts 101, 102, 100, R6BL n/o, R3BL n/o, relay R10, to the other side of the line. During the very end of a second card feed cycle which ensues, punch card lever contacts 92 (Fig. 7a) close to energize relay R7. Inasmuch as contacts 92 are caused to close at 13-time (see also Fig. 8), and since cam contacts P6 break at 9.2-time, the hold circuit to relay R10 is opened when cam contacts P6 break.

A third depression of the start key shown in Fig. 7b will cause relay R10 to energize once again via the circuit described previously. Due to the fact that the punch card lever contacts 92 maintain relay R7 (Fig. 7a) energized, relay R10 will remain energized from line 78 through contacts 101, 102, read stacker switch contacts 107, punch stacker contacts 108, relay contacts R4BL n/o, R6AL n/o, R7AL n/o, R1AU, R3AL n/o, relay R10 to line 79. The machine will stop running, of course, if any of the aforementioned contacts in the relay R10 hold circuit are caused to shift to therby open the hold circuit. Stacker contacts 107 and 108 are caused to open when their respective stackers become filled.

In order to maintain the punch and read card feed units in step with each other, that is, so as to accompany a card being fed from the read hopper R with a card being fed from the punch hopper P, interlocking circuits are provided. In addition, when the last card leaves either hopper, the machine will stop because of the opening of a pair of card lever contacts. This will cause either relay R3 (Fig. 7a) or relay R6 to de-energize. Referring once again to Fig. 7b, in order to restart the machine by depressing the start key, it will be necessary to place cards in the empty hopper in order to close the related hopper contacts, or it will be necessary to remove the remaining cards from the other hopper. Accordingly, relay R10 can once again be energized through either contacts R6BL n/o and R3BL n/o, or R6BL n/c and R3BL n/c.

The two card feed units are caused to keep in step by contacts R1AL and R4AL shown in Fig. 7a. After the first card feed cycle during which relays R1 and R4 are energized as described hereinbefore, the circuit for read feed clutch magnet 40 is controlled by contacts R1AL n/o, whereas the circuit for punch feed clutch magnet 60 is controlled by contacts R4AL n/o. This simply means that the read clutch magnet 40 is controlled by a card passing from the punch hopper P to the die station, and a punch feed clutch magnet 60 is controlled by a card passing from the read hopper R to the sensing brush station 30. If a card fails to feed from either hopper, the machine will stop through the de-energization of relay R1 or R4. If the card feed failure occurs in the punch feed, for example, the die card lever contacts 88 will open to deenergize relay R1. The transfer of contacts R1AU (Fig. 7b) to a non-operated status opens the circuit to relay R10, to thereby stop the machine. Relay contacts R1AL (Fig. 7a) also shift so as to open the circuit to read feed clutch magnet 40 (Fig. 7a). Hence, when the start key is depressed in order to restart the machine, a circuit will be completed via contacts R4AL n/o (Fig. 7b), to punch feed clutch magnet 60, but a circuit will not be completed to read clutch magnet 40. As the card feeds from the punch hopper to the die station, it causes relay R1 to energize once again. Thus, contacts R1AL are caused to shift to an operated position so that as cards continue to feed, the read feed clutch magnet 40 will be energized through contacts R1AL n/o. It may be seen that in this way the read unit is rendered inoperative for one cycle in order to make up for the cycle lost in the punch feed when relay R1 was originally de-energized. Thus, the two card feeds are kept in step. The interlock circuit operation is similar in the event that a card fails to feed from the read hopper R.

*Gang punching*

Since this operation involves only the punch feed unit, no interlocking circuits are necessary; and since switches 105 (Fig. 7c), 106 (Fig. 7a), and 109 (Fig. 7b) are set to the "off" position, the drive motor start and running circuits will differ from those used in the reproducing operation.

Inasmuch as switch 109 in the "off" position shunts contacts R6BL and R3BL, relay R10 is energized when the start key is depressed from line 78 through contacts 101, 102, 100, and switch 109. As in the reproducing operation, it is necessary to hold the start key depressed until the third card feed cycle when relay R7 (Fig. 7a) is maintained energized continuously to thereby effect a hold circuit for relay R10 (Fig. 7b) from line 78 through contacts 101, 102, 107, 108, R4BL n/c, R3AU, R6AL n/c, R7AL n/o, R1AU, R3AL n/o, relay R10, to the other side of the line.

Only the punch feed clutch magnet 60 shown in Fig. 7a is energized during a gang punching operation as long as contacts R10BL are closed. A circuit to energize magnet 60 is from line 78 through contacts R10BL, R1AL n/c, C1, and RM31-1, or R1AL n/o, R4AU, switch 106 in the "off" position, contacts C1, and RM31-1. A parallel circuit is established through contacts R10BL, R4AL n/c, R4AU and switch 106 in the "off" position.

*Operation*

As indicated hereinbefore, the function of this invention is to post data contained on each of a plurality of associated journal record cards, onto a single relating ledger record card. Prior to processing these record cards in the machine which embodies the present invention, the ledger cards and the journal cards are collated by a machine such as is described in Page Patent No. 2,359,670 issued on October 3, 1944, so that the journal cards within a particular group are stacked in front of the ledger card related to the group. Thus, for example, all of the checks 21 (Fig. 6) from checkbook No. 00003 will be collated in front of ledger card 20 (Fig. 5) relating to the same checkbook. In a similar fashion, journal cards, and more particularly checks as described in conjunction with the present embodiment from the same checkbook, are collated in front of the ledger card associated with the checkbook.

Figure 1:
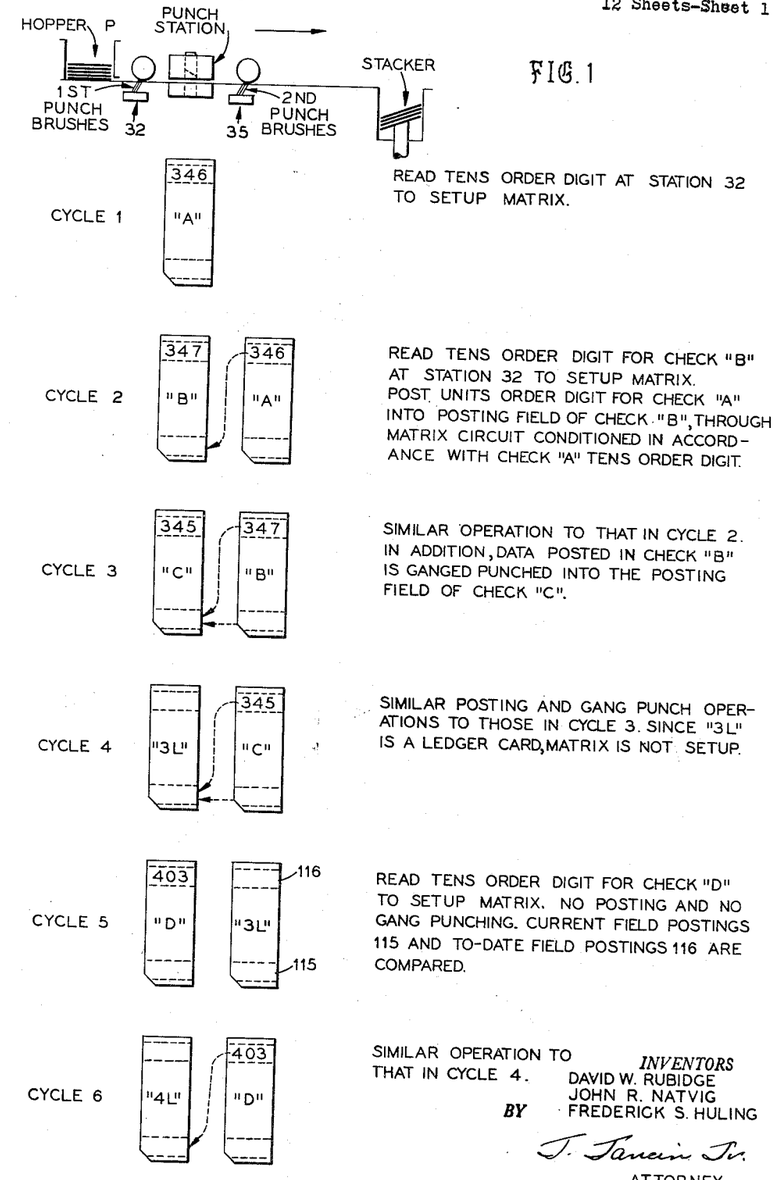
Figs. 1, 2 and 3 are flow charts depicting the three operational steps for which the embodiment of this invention is adapted.

To perform the posting operation on the punching machine described previously, the latter is set for gang punching. Referring to Fig. 1, during the first card feed cycle, the first journal record card, bank check A, is fed from hopper P past first punch brush station 32 (see also Fig. 4) whereat the tens order digit of the check identification number is read. The value of the digit in the tens order position causes the energization of matrix circuit setup relays to thereby condition the matrix circuit for selection of a posting field column indicative of the tens order digit. The matrix circuit will be described in detail hereinafter.

During the second card feed cycle, the units position of the identification number of check A is read by brush station 35 so as to direct a correspondingly timed impulse through the previously conditioned matrix circuit to a current posting field in the next succeeding journal record card, namely, bank check B. That is, check A which has an identification number of 46 will cause a posting to be effected in column 45 at the 6 index point position of card check B which, in turn, has an identification number 47. During the second feed cycle, the tens order position of the identification number of check B is read at station 32 to energize corresponding matrix circuit setup relays.

During the third card feed cycle, card check A is moved into the stacker, card check B is fed past station 35, and card check C is advanced past station 32. An impulse corresponding to the units order digit of check B is directed through the matrix circuit conditioned in accordance with the tens order digit value of the identification number of check B so as to effect a posting in the current posting field of check C. At the same time, the information relating to check A and contained in the current posting field of check B, is gang punched into the current posting field of check C. Consequently, at the completion of the third card feed cycle, the current posting field of check C has postings in column 45 at the six and seven index point positions to represent checks A and B.

During the third card feed cycle, the matrix circuit setup magnets are once again energized in accordance with the digit value of the tens order identification number. Thus, during the fourth card feed cycle when card C is fed past station 35, an impulse corresponding to the units order position of the bank check identification number is directed through the previously conditioned matrix circuit to effect a posting in the current posting field of the next succeeding card. As before, all of the postings contained in the check C are gang punched into the next succeeding card. It may be seen that the checks need not be arranged in any predetermined order. The only requirement is that only those checks from a given checkbook are stacked in front of the ledger card relating to that checkbook.

Inasmuch as the record card designated 3L is the ledger card for checkbook No. 00003, matrix circuit setup magnets are not energized when the card is fed past the station 32. In keeping with the foregoing, gang punching into the ledger card 3L, i. e., the next succeeding card, is prevented during the fifth card feed cycle when ledger card 3L is fed past station 35 and bank check D is fed past station 32. It is to be observed that check D is from another checkbook, and for this reason, it is not desired to have the postings relating to checkbook No. 00003 carried on into the posting field relating to another checkbook. During the fifth feed cycle, the information in current posting field 115 of ledger card 3L is compared with the information in to-date posting field 116 so as to check for duplicate postings. It is to be understood that the to-date postings are from a previous posting operation.

During the sixth card feed cycle, an impulse corresponding to the units order digit of the identification number of check D is directed through a matrix circuit conditioned in accordance with the tens order digit of the identification number of check D, to thereby effect a posting in the posting field of the next succeeding card. It may be seen that the next succeeding card referred to in cycle 6 is the ledger card 4L relating to the checkbook from which check D was taken.

As will be described hereinafter in the Posting and Checking Operation Circuits description, check stop orders are compared against all negotiated checks.

Figure 2:
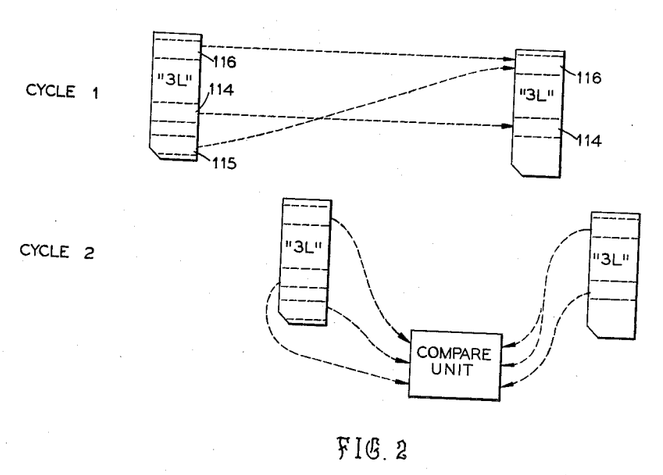
Figure 3:
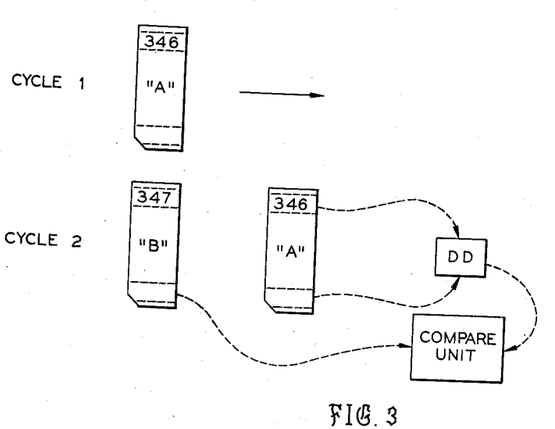

Referring to Fig. 3, the ledger and journal cards processed during the aforedescribed posting operation, are now placed into the read hopper R (see also Fig. 2) for a checking operation. During the first card feed cycle of this operation, matrix circuit setup magnets are energized in accordance with the tens order digit of the identification number of check A so that during the second card feed cycle an impulse corresponding to the units order digit of the identification number of check A is directed through the conditioned matrix circuit. This is compared with the posting effected during the previous run in check B.

The third operation for which the embodiment of this invention is adapted, is shown in Fig. 2. During this operation when the punching machine is run as a reproducing machine, new ledger cards are prepared for a subsequent posting operation. It must be evident that all the checks from a single checkbook are not negotiated during the same period of time. Hence, it must be evident that all of the checks from a given checkbook may not be posted during a single posting operation. The fact of the matter is that a posting operation relating to a given checkbook is required whenever a negotiated check is received, and such a posting operation must be anticipated so long as there are outstanding checks.

Referring to Fig. 2, during the first card feed cycle the information in the current posting field 115 and the to-date posting field 116 of the ledger card prepared during the operation depicted in Fig. 1, is reproduced in the to-date posting field 116 of the new ledger card.

During the second card feed cycle, the data contained on the old and the new ledger cards, are compared for any errors.

*Posting and checking operation circuits*

Figure 7C:
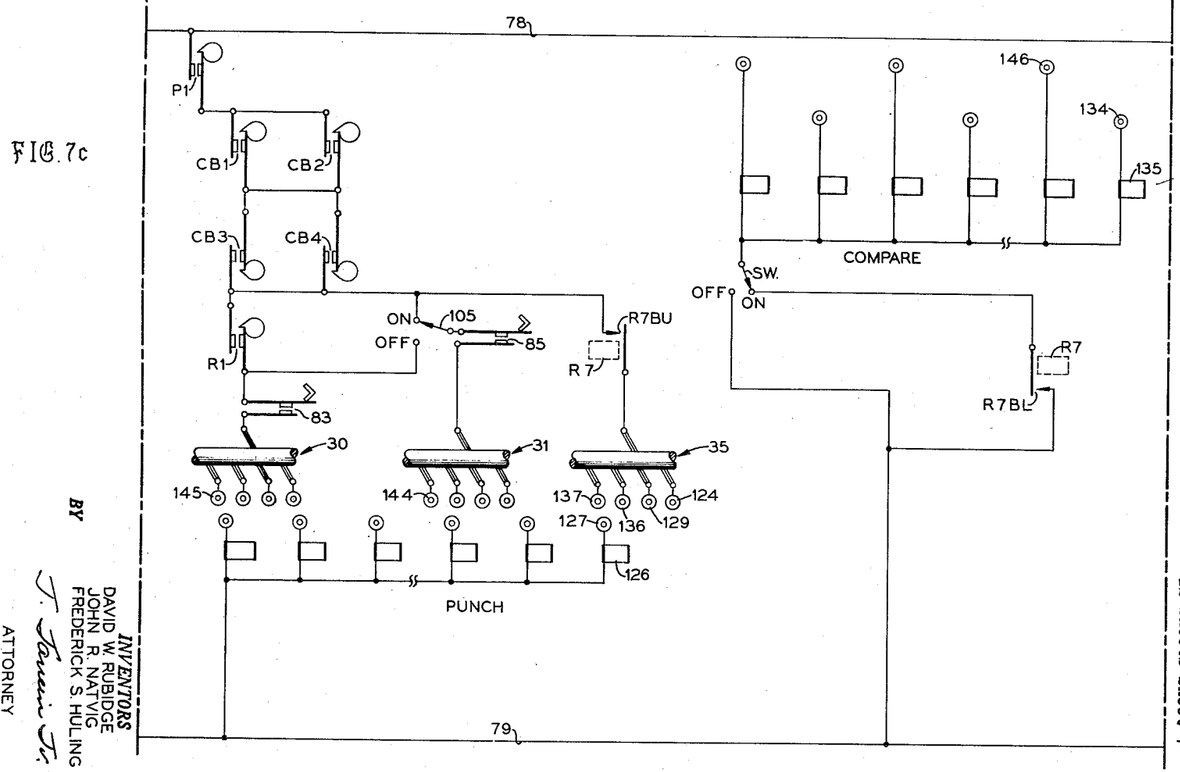
Figure 7E:
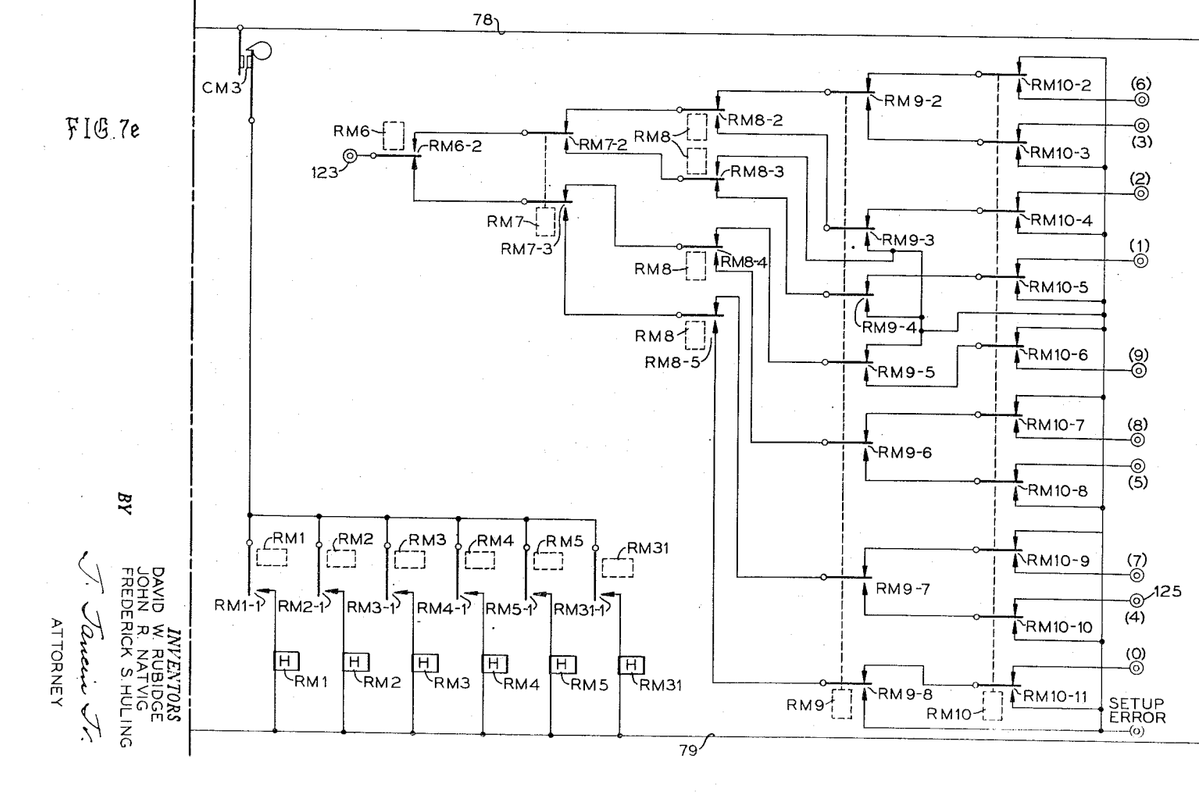
Figure 7F:
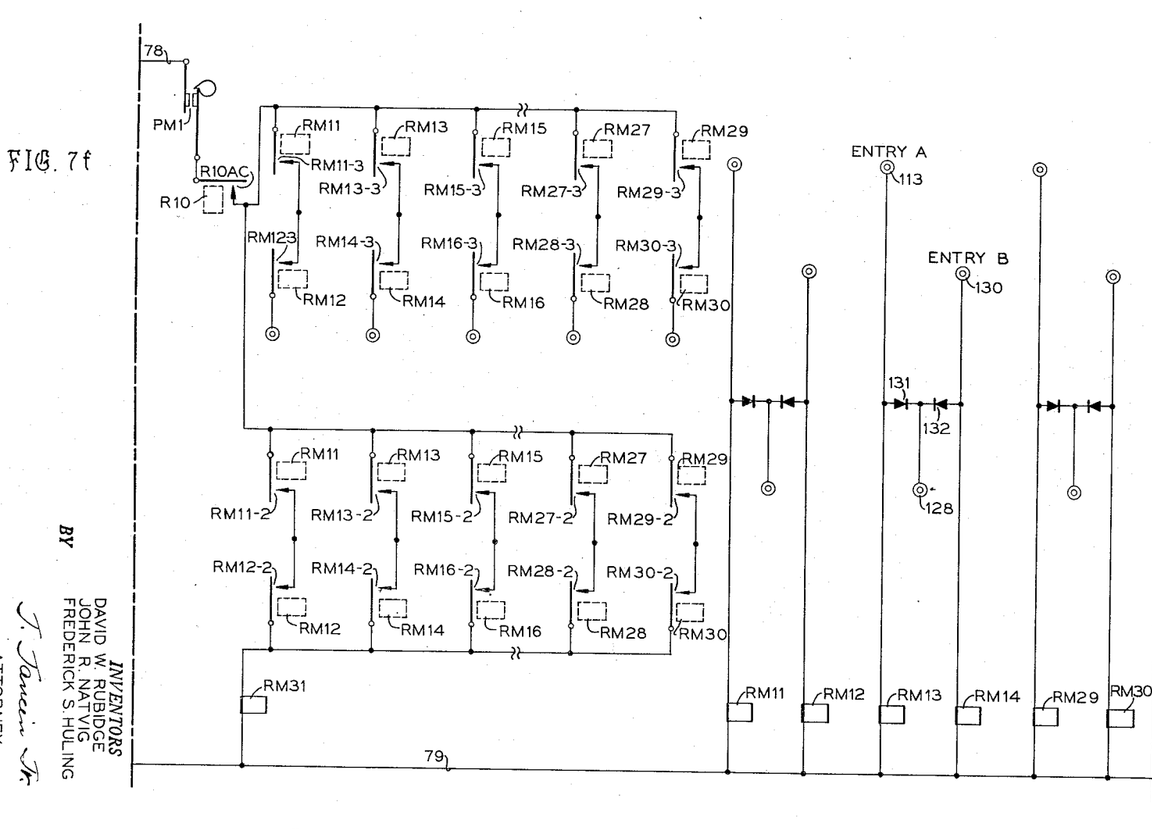
Figure 7G:
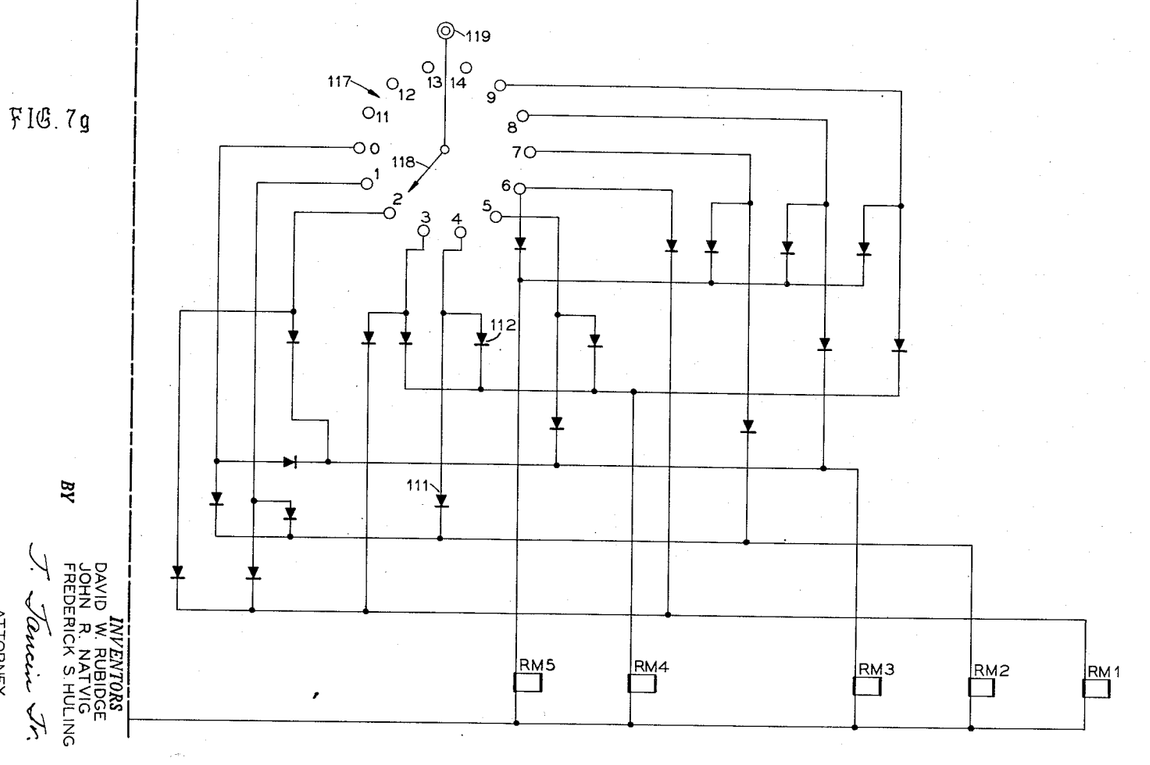

*Matrix circuit setup relays.*—The pick circuits for the matrix circuit setup relays RM1 through RM5, are shown in Fig. 7g. Timing distributor 117 is connected by suitable means to the punching machine drive so that wiper arm 118 engages the contacts 0 through 9 at corresponding index point timings shown in the timing chart of Fig. 8. The relays are picked according to the following two out of five code:

Digit:                                        Relays
  0 ........................................ RM2+RM3
  1 ........................................ RM1+RM2
  2 ........................................ RM1+RM3
  3 ........................................ RM1+RM4
  4 ........................................ RM2+RM4
  5 ........................................ RM3+RM4
  6 ........................................ RM1+RM5
  7 ........................................ RM2+RM5
  8 ........................................ RM3+RM5
  9 ........................................ RM4+RM5

During the ledger posting operation depicted in Fig. 1 and described previously, the matrix circuit setup relay hub 119 (Fig. 7g) is connected by plug wire to hub 120 (Fig. 7d) associated with the brush in first punch reading station 32 (see also Fig. 4) for reading the tens order digit column of the check identification number (see also Fig. 6). During this operation hubs 121 and 122 are connected by plug wire. Assuming the card being fed past reading station 32 has a 4 hole punched in column 6, the tens order column of the check identification number (see also Fig. 6), a circuit is completed to energize setup magnets RM2 and RM4 from line 78 through contacts P4, CB5 or CB6 and CB7 or CB8, CM1, R1–4, sensing station 32, contacts R32–2 n/o (relay R32 is energized at this time through contacts P4), the plug wire connecting hub 120 to hub 119 (Fig. 7g), the wiper arm 118 engaging segment 4 at 4-time, and diode 111 to relay RM2 and diode 112 to relay RM4.

The transfer of contacts controlled by these relays completes a hold circuit thereto through cam contacts CM3 (Fig. 7e) and respective relay stick points.

*Matrix relays.*—The matrix relays RM6 (Fig. 7d) through RM10 are energized at the end of the card feed cycle during which the matrix circuit setup relays are energized. In other words, since setup relays RM2 and RM4 were energized in accordance with the 4 digit in the tens order position of the check identification number, matrix relays RM7 and RM9 are picked at 13-time when cam contacts P3 close. The matrix relays which are energized, namely, relays RM7 and RM9, are maintained in an operated status for the following card feed cycle through cam contacts P2 and respective relay stick points. The matrix relays are picked according to the following code:

Digit:                                        Relays
  0 ........................................ RM7+RM8
  1 ........................................ RM6+RM7
  2 ........................................ RM6+RM8
  3 ........................................ RM6+RM9
  4 ........................................ RM7+RM9
  5 ........................................ RM8+RM9
  6 ........................................ RM6+RM10
  7 ........................................ RM7+RM10
  8 ........................................ RM8+RM10
  9 ........................................ RM9+RM10

*Data posting circuit.*—For the operation being described presently, the units order entry hub 123 (Fig. 7e) is connected by plug wire to hub 124 (Fig. 7c) which is connected to the reading brush in second punch brush reading station 35 for sensing the units order column, column 7 (see also Fig. 6) of the check identification number. Assuming the units order digit to be a 6, an impulse at 6-time will be directed from line 78 through contacts P1, CB1 or CB2 and CB3 or CB4, R7BU, reading station 35, the plug wire connecting hubs 124 and 123 (Fig. 7e), relay contacts RM6–2 n/c, RM7–3 n/o, RM8–5 n/c, RM9–7 n/o, and RM10–10 n/c, to hub 125. Inasmuch as hub 125 is associated with the digit 4 in the tens order position of the check identification number, hub 125 is connected by plug wire to the punch control magnet 126 (Fig. 7c) for controlling punching in column 45 of the current posting field (see Figs. 5 and 6). Since, as is described in the aforementioned Lake patent, the card following the one causing punch magnet 126 to become energized at 6-time, is located in the punch station 33 so that the line of punches 34 are opposite the six index point position row, a hole is punched in column 45 of the second card at the six index point position.

*Duplication detection.*—As it is necessary to post and gang punch information into the same current posting field (refer to Fig. 1), a circuit somewhat different from the one described hereinabove is actually required to avoid cross circuits. Instead of connecting hub 25 (Fig. 7e) to hub 127 (Fig. 7c), hub 125 is connected by plug wire to entry A hub 113 (Fig. 7f). Hub 128 is connected by plug wire to punch control magnet hub 127 (Fig. 7c), and hub 129 associated with the brush in second punch brush station 35 for reading the data contained in column 45 (Figs. 5 and 6) is connected by plug wire to entry B hub 130 (Fig. 7f). Thus, the impulse directed to hub 125 (Fig. 7e) is now further directed to hub 113 via the plug wire therebetween, diode 131, and the plug wire connecting hubs 128 and 127 (Fig. 7c). During straight gang punching of information contained in the posting field, timing impulses are directed from line 78 through station 35, the plug wire connecting hubs 129 and 130 (Fig. 7f), diode 132, and the plug wire connecting hubs 128 and 127 (Fig. 7c).

In order that a previous posting designated by an impulse to hub 130 (Fig. 7f) is not duplicated by a current posting designated by a similarly timed impulse to hub 113, a duplication detection circuit is provided. It may be seen in Fig. 7f that an impulse directed to hub 113 causes energization of relay RM13, and an impulse directed to hub 130 causes the energization of relay RM14. The contacts of these two relays are connected in series circuit between contacts R10AC and relay RM31. So long as relays RM13 and RM14 are not energized by similarly timed impulses, the circuit to relay RM31 cannot be formed. However, in the event that relays RM13 and RM14 are energized concurrently, a circuit is completed to relay RM31 from line 78 through cam contacts PM1, relay contacts R10AC, R13–2, R14–2, relay RM31, to line 79. The hold circuit for this relay is shown in Fig. 7e to include contacts CM3 and RM31–1. The contacts controlled by relay RM31, namely contacts RM31–1 and RM31–2 (Fig. 7a), will immediately open the clutch circuits to stop the machine.

During the time that relay RM31 (Fig. 7f) is being energized, an impulse is directed through contacts R13–3 and R14–3 to hub 133 which is connected by plug wire to a comparing position plug hub 134 (Fig. 7c) included within a comparing unit such as is described in Patent No. 2,053,067, issued to J. M. Cunningham. The energization of comparing magnet 135, one terminal of which is connected to hub 134, will indicate the card column in which the duplication occurred, and will maintain the machine in a stopped condition until the comparing unit is restored; contacts 101 (Fig. 7b) are caused to open. Inasmuch as this is not a feature of the present invention, and since this is described sufficiently in the aforementioned patent, further description herein is not indicated.

*Ledger card duplication detection.*—As described with reference to the fifth card feed cycle shown in Fig. 1, the data postings contained in current field 115 are compared with those in to-date field 116 so as to detect any duplications therebetween. By class selection means well known to those persons familiar with this art, the entry A hubs (Fig. 7f), such as hub 113 for example, are disconnected from the circuit including hub 125 (Fig. 7e), and are instead connected to second punch station hubs 136 (Fig. 7c) for reading the to-date posting field columns 20 through 29 in ledger card 20 (see Fig. 5). As a result, to-date posting field columns 20 through 29 and current posting field columns 40 through 49 are analyzed concurrently to determine whether there are any duplicate postings. If there are, concurrent impulses to the entry A and B hubs (Fig. 7f) will start a train of events whereby relay RM31 is energized.

*Stop checks checking.*—During the aforedescribed ledger card duplication detection operation, a class selector means is operated to double wire the brushes in station 35 represented by hub 137 (Fig. 7c) for reading columns 60 through 69 (Fig. 5) to corresponding entry A hubs shown in Fig. 7e. This might be accomplished by connecting hubs 136 (Fig. 7c) and 137 by a plug wire so that the brushes for reading columns 29 and 69 (Fig. 5) are connected in parallel circuit, as are the brushes for columns 28 and 68, 27 and 67, etc. Hence, a posting in column 62 at the eight index position and a posting in column 42 at the eight index point position will cause concurrent impulses to the duplication detection entry A and entry B hubs to thereupon cause the energization of relay RM31. Inspection of the ledger card will indicate to the operator of the punching machine that the check for which a stop order was issued, namely check 78, was negotiated.

The checking operation depicited in Fig. 3 is one wherein the check identification number once again causes an impulse to be directed through a conditioned matrix circuit, this impulse being applied to the duplication detection entry A hubs shown in Fig. 7b. The information contained in the current posting field of each check is directed to the duplication detection entry B hubs. The common duplication detection exit hubs are wired to one side of the comparing unit mentioned hereinbefore and described in the Cunningham patent, whereas the information contained in the current posting field of the next succeeding card is applied to the other side of the comparing unit. This simply means that the information contained in the posting field of check B must include the identification number posting of check A as well as the information contained in the current posting field of check A.

For this checking operation, plug hubs 121 (Fig. 7d) and 143 are connected as are hubs 144 and 119 (Fig. 7g). Hug 144 shown in Fig. 7d is associated with the brush in first read brush station 29 for reading column 6 of check 21 (Fig. 6) in which the tens order digit of the check number is contained. Thus, in a fashion similar to that described previously under the paragraph heading "matrix circuit setup relays," the latter relays RM1 through RM5 shown in Fig. 7g are energized via a circuit generally described from line 78 (Fig. 7b) through the plug wire connecting hubs 121 and 143, reading station 29, the plug wire connecting hubs 144 and 119 (Fig. 7g), the timing distributor 117, to two out of the five setup relays RM1 through RM5.

During the following card feed cycle when the card is traversing the third read brush station 31 an impulse controlled by the perforation in the units order column, column 7 of check 21 (Fig. 6), is directed through the conditioned matrix circuit shown in Fig. 7e from hub 123 to hub 125 (assuming the tens order digit is a four once again). Hub 125 is connected by plug wire to an entry A duplication detection hub, such as hub 113 (Fig. 7f) for example. The data contained in the current posting field of the card being analyzed by station 31 (Fig. 4) is applied to duplication detection entry hubs B so that a circuit is completed, for example, from line 78 (Fig. 7c) through contacts P1, CB1 or CB2 and CB3 or CB4, switch 105 in the "on" position, contacts 85, sensing station 31, the plug wire connecting hub 144 associated with a brush for reading a current posting field column (see Fig. 6) and hub 130 (Fig. 7f). The duplication detection exit hub, such as hub 128 for example, is connected to one side of the compare unit shown in Fig. 7c. The current posting field being analyzed by second read brush station 30 is applied to the other side of the compare unit so that a circuit is formed from line 78 through the aforementioned contacts P1, CB1 or CB2 and CB3 or CB4, in addition to contacts R1, 83, reading station 30, and a plug wire connecting hubs 145 and 146. Hub 145 is associated with a reading brush for analyzing a current posting field card column 40 through 49 (Fig. 6).

In the event that concurrent impulses are not directed to homologous compare hubs 134 and 146, for example, an error will be indicated.

The third operation depicted in Fig. 2 whereby new ledger cards are prepared for subsequent posting operations is a straight forward card reproducing operation which, at this point, requires but brief description. The current and to-date posting fields 115 and 116, respectively, and the stop checks and book number fields designated by the common reference numeral 114, are reproduced during the first feed cycle as is shown. During the second feed cycle, the data contained in the pattern, or old ledger, card is compared with the data contained in the new ledger card. Any discrepancy will be indicated as an error.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. A record card controlled machine for perforating a rectangular coordinate system posting field arranged on a record card comprising a plurality of record card perforating means positioned along one axis of a rectangular coordinate system, record card feeding means for moving the posting field relative to said perforating means along the other axis of a rectangular coordinate system, multi-order digit manifesting means, selecting network circuit means controlled by said manifesting means to condition for operation a selected one of said perforating means indicative of a digit in one order of a multi-order number, and other means controlled by said manifesting means for operating the selected recording means when said recording means is located along the said other axis at a position indicative of a digit in another order of the multi-order number.

2. In a ledger card posting machine controlled by journal cards containing duo-order data to be posted; a plurality of digit representing posting means; a first card reading means for sensing one order of duo-order data; a second card reading means for sensing another order of duo-order data; card feeding means for moving said cards, one by one, past said posting means and said first and said second reading means, a plurality of electrical channels adapted to be interposed between said posting means and said second reading means, a plurality of electrical means and said second reading means; a first means controlled by said first reading means for selectively controlling the interposition of one of said channels between said second reading means and posting means corresponding to a digit in one order of duo-order data; and a second means controlled by said second reading means for directing through the selected channel an impulse corresponding to a digit in another order of duo-order data to thereby operate posting means associated therewith.

3. In a cyclically operable record card controlled machine for posting data in a card field consisting of a plurality of digit representing columns and a plurality of digit representing rows, the combination of a plurality of posting means, one for each digit 0–9; a first card reading means for sensing a digit in one order of data; a second card reading means for sensing a digit in another order of data; a card feeding means for moving said cards cyclically, one by one, past said first reading means and said posting means during a first cycle and past said second reading means during a second cycle; a plurality of electrical channels, one for each digit 0–9, adapted to be interposed between said posting means and said second reading means; a first means controlled by said first reading means during the first cycle to selectively control the interposition of one of said channels between said second reading means and posting means corresponding to a digit in said one order of the data; and a second means controlled by said second reading means during the second cycle to direct an impulse through the selected channel corresponding to a digit in said another order of the data for operating posting means associated therewith to thereby effect a posting on the next succeeding card.

4. A cyclically operable record card punching machine comprising a plurality of punch control magnets; a first station for reading digit representing holes located in one column of said cards; a second station for reading digit representing holes located in another column of said cards; a card feeding means for moving said cards, one by one, past said first station and said magnets during a first cycle and past said second station during a second cycle; an electric circuit network adapted to be interposed between a selected one of said magnets and said second station; relays controlled by said first station during the first cycle to selectively control the interposition of said network between said second station and one of said magnets corresponding to digit representing holes located in said one card column; impulse generating means; and means controlled by said second station during the second cycle for controlling said impulse generating means so as to direct through said network a timed impulse corresponding to digit representing holes located in said another card column so as to energize the selected magnet whereby a perforation-posting is effected on the next succeeding card to represent the holes read by said first and said second stations.

5. A cyclically operable record card controlled data posting machine comprising a plurality of digit representing data posting means, a first card reading means, a second card reading means, card feeding means for moving said cards, one by one, past said first reading means and said data posting means during a first cycle and past said second reading means during a second cycle, an electric network adapted to be interposed between said posting means and said second reading means, a first means controlled by said first reading means during the first cycle to selectively control the interposition of said network between said second reading means and one of said posting means, a second means controlled by said second reading means during the second cycle to direct an impulse through said selectively controlled network for operating the one of said posting means associated therewith so as to effect a posting on the next succeeding card, and circuit means connecting said posting means and said second reading means for transferring during a third cycle, data postings contained on said next succeeding card to a following card.

6. A punching machine according to claim 4 additionally comprising electric circuit means controlled by said second card reading means, for directing timed impulses from said generating means to said magnets so as to gang punch the perforation-posting contained on said next succeeding card onto a following card.

7. A cyclically operable record card punching machine comprising a plurality of punch control magnets; a first station for reading digit representing holes located in one column of said card; a second station for reading digit representing holes located in another column of said card; a card feeding means for moving said card, one-by-one, past said first station and said magnets during one cycle and past said second station during another cycle, so that a first card is moved past said first station and said magnets during a first cycle and past said second station during a second cycle, and the next following card is moved past said first station and said magnets during the second cycle and past said second station during a third cycle; an electric circuit network adapted to be interposed between a selected one of said magnets and said second station; relays controlled by said first station during the first cycle to selectively control the interposition of said network between said second station and one of said magnets corresponding to digit representing holes located in said one card column of said first card; impulse generating means; means controlled by said second station during the second cycle of said first card for controlling said impulse generating means so as to direct through said network a timed impulse corresponding to digit representing holes located in said another card column of said first card so as to energize the selected magnet whereby a perforation-posting is effected on said next following card to represent the holes read by said first and said second stations; and electric circuit means controlled by said second station during the third cycle, for directing timed impulses from said generating means to said magnets so as to gang punch the perforation-posting contained on said next following card onto a succeeding card.

8. In a record card perforating machine of the class described for posting dual-order representing data recorded in a two columnar field of a first record card, in a second record card data field consisting of a plurality of columns each of which is indicative of a digit in one order of a dual-order number and a plurality of rows each of which is indicative of a digit in another order of a dual-order number, the combination of a translating device comprising means for reading dual-order representing data recorded in the two columnar field of said first record card; a plurality of punch magnets, one for each of the plurality of columns in said second record card; means for feeding the record cards past said reading means and said punch magnets in an order such that said second record card trails said first record card; a punch magnet selecting network governed by said reading means to condition for operation a selective punch magnet corresponding to a digit in one order of a dual-order number; and means for directing an impulse corresponding to a digit in another order of the dual-order number through said selecting network so as to render operative the selected punch magnet, whereby a perforation is placed in said second record card at a co-ordinate determined by the column and the row representing the dual-order number.

References Cited in the file of this patent

UNITED STATES PATENTS

| Re. 21,133 | Lake | June 27, 1939 |
| 328,600 | Munson | Oct. 20, 1885 |
| 1,667,881 | Campbell | May 1, 1928 |
| 1,954,042 | Ford | Apr. 10, 1934 |
| 2,172,062 | Chertman | Sept. 5, 1939 |